United States Patent
Lyle et al.

(10) Patent No.: US 7,747,458 B2
(45) Date of Patent: Jun. 29, 2010

(54) ELECTRONIC CALENDAR AUTO EVENT RESOLUTION SYSTEM AND METHOD

(75) Inventors: Ruthie D. Lyle, Durham, NC (US); Demethria J. Ramseur, Smyrna, GA (US)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 11/548,570

(22) Filed: Oct. 11, 2006

(65) Prior Publication Data
US 2008/0091504 A1      Apr. 17, 2008

(51) Int. Cl.
*G06F 17/60* (2006.01)
(52) U.S. Cl. .......................................................... 705/9
(58) Field of Classification Search ................ 705/9
See application file for complete search history.

(56) References Cited

U.S. PATENT DOCUMENTS

| | | | |
|---|---|---|---|
| 4,866,611 A | | 9/1989 | Cree et al. |
| 5,070,470 A | * | 12/1991 | Scully et al. ................ 708/112 |
| 5,261,045 A | | 11/1993 | Scully et al. |
| 5,963,913 A | * | 10/1999 | Henneuse et al. ............... 705/9 |
| 6,216,110 B1 | | 4/2001 | Silverberg |
| 7,096,232 B2 | * | 8/2006 | Doss et al. ............... 707/104.1 |
| 7,343,313 B2 | * | 3/2008 | Dorenbosch et al. ........... 705/8 |
| 7,379,888 B1 | * | 5/2008 | Mahapatro ...................... 705/8 |
| 7,395,221 B2 | * | 7/2008 | Doss et al. ...................... 705/9 |
| 2004/0064585 A1 | | 4/2004 | Doss et al. |
| 2004/0093290 A1 | | 5/2004 | Doss et al. |
| 2004/0221010 A1 | | 11/2004 | Butler |
| 2005/0202817 A1 | * | 9/2005 | Sudit .......................... 455/433 |
| 2005/0288987 A1 | | 12/2005 | Sattler et al. |
| 2007/0282654 A1 | * | 12/2007 | Sarkar ........................... 705/8 |
| 2008/0046514 A1 | * | 2/2008 | Daughtry et al. ............ 709/204 |

FOREIGN PATENT DOCUMENTS

EP          1109121 A2 *  6/2001

OTHER PUBLICATIONS

"Participation Status on Computer Calendar Systems," Research Disclosure. No. 298. Feb. 1989. Kenneth Mason Publications Ltd.

* cited by examiner

*Primary Examiner*—Romain Jeanty
(74) *Attorney, Agent, or Firm*—Anna Linne; Roberts Mlotkowski Safran & Cole, P.C.

(57) ABSTRACT

A system and method for event resolution. The method includes determining whether a post-scheduled event or a pre-scheduled event conflicts with a scheduled event. The method further includes extracting details of the post-scheduled event or the pre-scheduled event and automatically populating a response with at least some of the extracted details. The method further includes sending the response with an accept indication when the post-scheduled event or the pre-scheduled event does not conflict with the scheduled event, or sending the response with a cancel indication when the post-scheduled event or the pre-scheduled event conflicts with the scheduled event, or sending the response with a tentatively accept indication when the post-scheduled event or the pre-scheduled event conflicts with the scheduled event.

24 Claims, 3 Drawing Sheets

ELECTRONIC CALENDAR AUTO EVENT RESOLUTION SYSTEM AND METHOD

FIELD OF THE INVENTION

The invention generally relates to a system and method of electronic calendar automatic event resolution and, more particularly, to a system and method configured to provide event resolution for both pre-scheduled and post-scheduled events.

BACKGROUND OF THE INVENTION

Electronic office tools are ubiquitous in today's business environments. These electronic office tools include, for example, calendars, appointment books, address books and contact lists, to name a few. In fact, these tools are typically an extension of features provided by time management software such as desk accessory packages and mainframe office automation systems. These tools are often packaged by original equipment manufacturers. For example, International Business Machines Corp. (IBM) packages many of these features in Lotus Notes®. (IBM and Lotus Notes are trademarks of International Business Machines Corporation in the United States, other countries, or both).

Calendaring and other time management systems are very powerful tools. For example, these tools allow a user to schedule appointments such as team meetings or other appointments and notify and/or remind participants by email of such appointments. Calendar features also include automatic event reminders, including mobile phone notifications, which instantly bring up calendar events with built-in search tools.

By way of a more specific example, electronic calendars have special functionality which allows users to track scheduled events, add events to a calendar, and notify/invite other individuals of the scheduled events. In addition, many electronic calendars permit the user to denote blocks of time for scheduled vacation, either as half day vacations or full day vacations, site holidays and other customized out of the office events. In fact, some calendars permit a sharing feature to allow other users to see upcoming events on another user's calendar.

These functions are all very useful when organizing and scheduling events and, in particular managing time. However, it is not uncommon for scheduled events to conflict with one another, unbeknownst to the user. For example, a user may have scheduled a block of time for an out of office event such as a vacation, but also accepted an appointment for a business meeting during this same time. This would typically occur, as one example, by a colleague sending a recipient an email invitation requesting a meeting at a certain time and date. The recipient would accept the invitation by "hitting" the "accept" button, which, in turn, would automatically notify the sender of such acceptance. By doing so, the business meeting would automatically be placed into the recipient's calendar at the accepted time and date. However, unwittingly, the accepted invitation may conflict with a scheduled vacation. This may not be realized, at all, or may be realized only after the recipient was looking through his/her calendar for other scheduled events.

Accordingly, there exists a need in the art to overcome the deficiencies and limitations described hereinabove.

SUMMARY OF THE INVENTION

In a first aspect of the invention, a method comprises determining whether a scheduled event is confirmed and whether a user is designated as a chair of a meeting. When the user is designated as the chair and the scheduled event is confirmed, for each meeting conflicting with the scheduled event, the method cancels, reschedules the meeting to a non-conflicting time or performs an action. When the user is not designated as the chair and the scheduled event is confirmed, the method performs an action.

In another aspect of the invention, a method comprises determining whether a post-scheduled event or a pre-scheduled event conflicts with a scheduled event. The method further includes extracting details of the post-scheduled event or the pre-scheduled event and automatically populating a response with at least some of the extracted details. The method further includes sending the response with an accept indication when the post-scheduled event or the pre-scheduled event does not conflict with the scheduled event, or sending the response with a cancel indication when the post-scheduled event or the pre-scheduled event conflicts with the scheduled event, or sending the response with a tentatively accept indication when the post-scheduled event or the pre-scheduled event conflicts with the scheduled event.

In another aspect of the invention, a method is provided for deploying an application for event resolution. The method comprises providing a computer infrastructure being operable to: determine whether a post-scheduled event or a pre-scheduled event conflicts with a scheduled event; extract details of the post-scheduled event or the pre-scheduled event; automatically populate a response with at least some of the extracted details; and send the response. The response may include an accept indication when the post-scheduled event or the pre-scheduled event does not conflict with the scheduled event. The response may include a cancel indication when the post-scheduled event or the pre-scheduled event conflicts with the scheduled event. The response may include a tentatively accept indication when the post-scheduled event or the pre-scheduled event conflicts with the scheduled event.

In yet another aspect of the invention, a system comprising at least one of a hardware and software component is provided for event resolution between a scheduled event and at least one of a pre-scheduled event and post-scheduled event. The hardware and/or software component is configured to: determine whether there is a conflict between the scheduled event and at least one of the pre-scheduled event and post-scheduled event, if existing; update a calendar with a non-conflicting event; and notify a sender of the at least one of the pre-scheduled event and post-scheduled event that a recipient accepts, declines or tentatively accepts a time for the at least one of the pre-scheduled event and post-scheduled event, depending on a conflict.

In a further aspect of the invention, a computer program product comprises a computer usable medium having readable program code embodied in the medium. The computer program product includes at least one component to provide the method steps of the invention. The at least one component can also provide the functionality of the system of the invention.

DETAILED DESCRIPTION OF EMBODIMENTS OF THE INVENTION

The invention is directed to a system and method of electronic calendar automatic event resolution. In an embodiment of the invention, the method and system is configured to provide event resolution for both pre-scheduled and post-scheduled events that coincide with times in which the user will (or may) be unavailable, e.g., out of the office. The system and method of the invention will save the user time by automatically resolving meeting information using a set of predetermined choices to automate the process of dealing with events that coincide with scheduled conflicts such as, for example, time out of the office. Meetings are defined broadly to encompass teleconferences, lectures/seminars, or other events which require participation from the intended user. Possible resolutions may include, but not be limited to, automatically rescheduling and/or declining meetings. Additionally, by implementing the system and method of the invention, time to schedule events and notify others will be greatly reduced, compared with conventional systems. The invention can be implemented over any distributed network or standalone server, for example.

Figure 1:
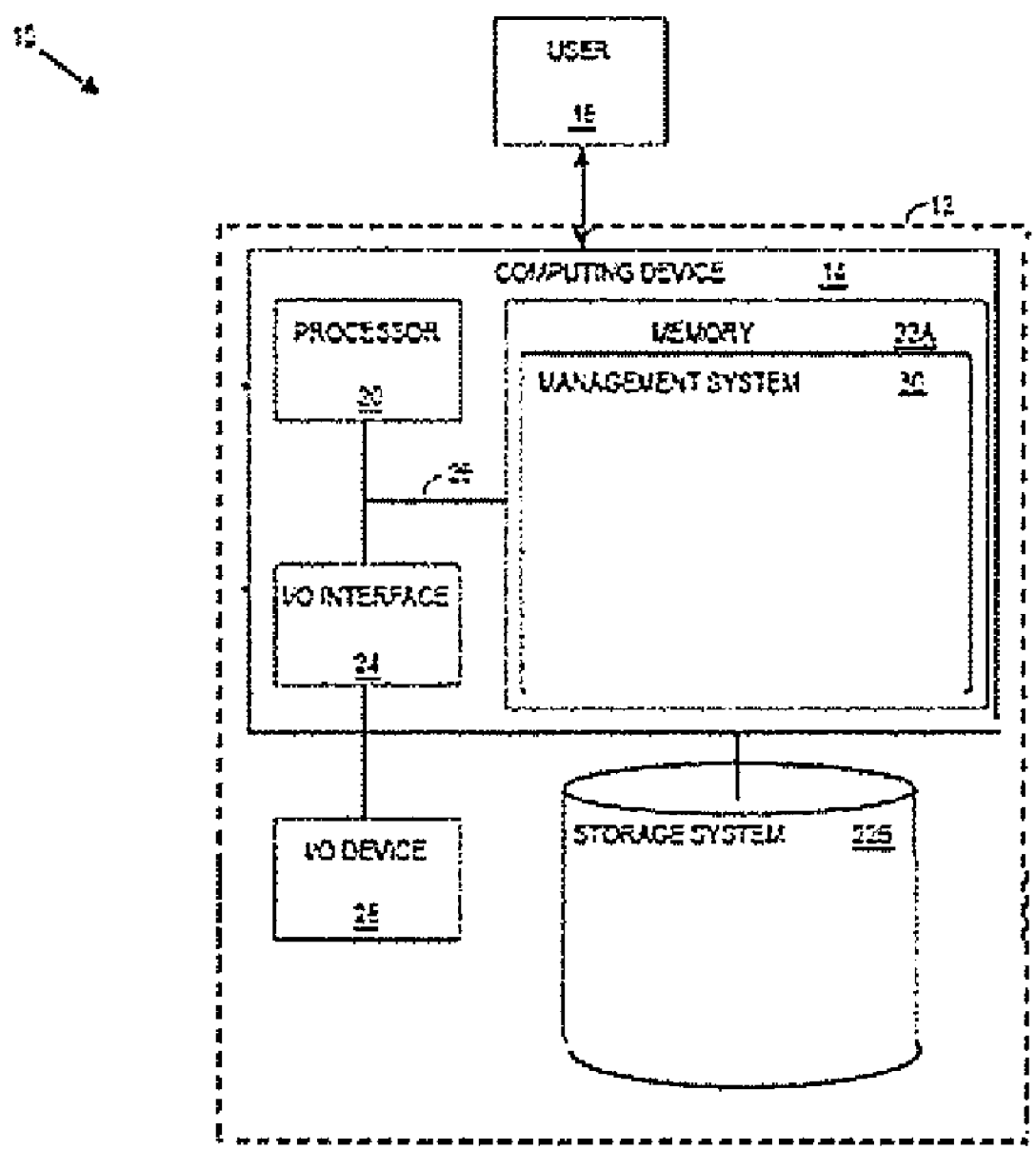
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to perform electronic calendar automatic event resolution in accordance with the invention, e.g., processes described herein. The computing device 14 includes a processor 20, a memory 22A, an input/output (110) interface 24, and a bus 26. Further, the computing device 14 is in communication with an external I/O device/resource 28 and a storage system 22B.

In general, the processor 20 executes computer program code, which is stored in memory 22A and/or storage system 226. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols. As discussed herein, the management system 30 enables the computer infrastructure 12 to provide electronic calendar automatic event resolution.

In embodiments, the invention provides a business method that performs the process steps of the invention on a subscription, advertising, and/or fee basis. That is, a service provider, such as a Solution Integrator, could offer to perform the processes described herein. In this case, the service provider can create, deploy, maintain, and support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

In one embodiment, the invention is configured to reconcile both pre-scheduled and post-scheduled events. Pre-scheduled events may include events that are pre-scheduled prior to a time being denoted as out-of-office or other event blocked on the schedule. Post-scheduled events may include events that are scheduled after an out-of-office or other conflicting event is already blocked on the scheduled. A conflicting event may denote any event in which there is time blocked on the calendar, whether that is a meeting or other scheduled event on the calendar.

In embodiments, the system and method is configured to determine if the out-of-office or other conflicting event (hereinafter referred to as "conflicting event") is definite or tentative. This may be accomplished by creating a profile that allows a user to indicate the number of days prior to an event to confirm the conflicting event. The system will prompt the user several days or other predetermined time period prior to the conflicting event to confirm the conflicting event. If the conflicting event is confirmed, automatic event notifications will be sent to other persons attempting to schedule an appointment, which would otherwise conflict with the conflicting event.

In further embodiments, in the event that the user cancels the conflicting event, it is possible to retrieve the pre-scheduled or post-scheduled event. By way of one example, pre-scheduled or post-scheduled events may be saved in a log file for future reference. Additional details can be included in the log file such as the original meeting date and the date rescheduled meeting date. The system and method further provides the ability to automatically restore the meeting details to the calendar after they have been removed. The log file will be utilized to allow this functionality.

In the case of a pre-scheduled event (e.g., an event is listed on the user's calendar prior to scheduling the conflicting event), the system and method can perform certain functions when a conflicting event is later scheduled. For example, for events that are chaired by a third party, the system and method of the invention is configured to perform the following functions:

1. In the case that the conflicting event (e.g., vacation) is tentatively scheduled, system and method of the invention is configured to update the response from "accept" to, e.g., "tentative accept pending vacation determination". The system and method may also send an update note (email) to the chair indicating the changed status.
2. In the case that the conflicting event is definite, the system and method of the invention is configured to update the response from "accept" to "decline". A prompt, via an email, for example, may be sent to the chair indicating the changed status.
3. In the case that the conflicting event is canceled, the system and method of the invention is configured to use the log to retrieve the scheduled information and restore the meeting details to the calendar. The system and method of the invention is configured to send a prompt, via an email, for example, to the chair indicating the changed status.

For events that are chaired by the user (recipient), the system and method of the invention is configured to perform the following functions:

1. In the case that the conflicting event is tentative or definite, the system and method of the invention is configured to delegate the meeting to someone else to chair. The system and method may retrieve information about the invited attendees from the log, and select one or more of these invited attendees as the chair. In the alternative approach, the system and method may parse an email sent to all invited attendees to determine attendee information such as, for example, names and contact information. The system and method can then notify such person(s) via email, for example. In the case that no chair can be found or a requested chair has declined the responsibility, the system and method is configured to automatically or via user prompt provide a "cancel" notice to the invited attendees.
2. In the case that the conflicting event is definite or tentative, the system and method is configured to cancel the meeting and send a cancellation notice to all invited attendees.
3. In the case that the conflicting event is cancelled, the system and method of the invention is configured to use the log to retrieve the scheduled information and restore the meeting details to the calendar. The system and method of the invention is configured to send a prompt, via an email, for example, to the invited attendees indicating the changed status, e.g., the meeting will proceed at the scheduled time.
4. In any scenario, the system and method is configured to automatically reschedule the meeting using the same invited attendees and meeting details. In one implementation, the meeting can be rescheduled is the available attendees are above a percentage of individuals that can attend the meeting.

In the case of a post-scheduled event, the system and method can perform certain functions when a conflicting event is scheduled as block of time on the calendar. For example, for conflicting events that are tentatively scheduled, the system and method of the invention is configured to perform the following functions:

1. In the case that the user receives a meeting invitation chaired by someone else, the system and method of the invention is configured to either tentatively accept or decline the meeting.
2. In the case that the user receives a meeting that someone wants to delegate to the user as the chair, the system and method of the invention is configured to:
   a. redelegate the chair to another attendee,
   b. tentatively accept/decline the delegation, or
   c. automatically reschedule the meeting using the same invited attendees and meeting details, in the manner described above.

Figure 2:
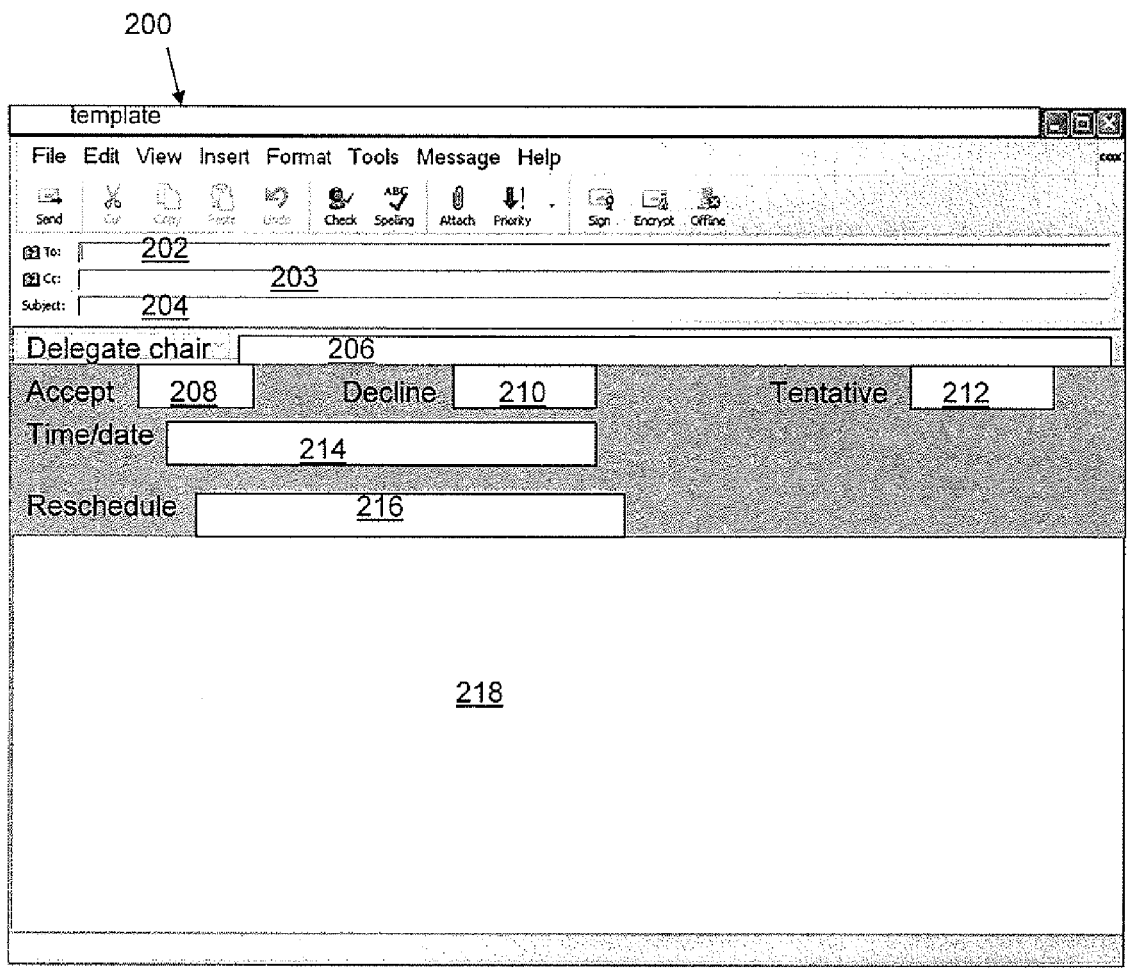
FIG. 2 shows a sample template used in implementing the invention.

In the case of a conflicting event is definitely scheduled, the system and method of the invention is configured to perform the following functions:

1. In the case that the user receives a meeting invitation chaired by someone else, the system and method is configured to decline and update the sender with a customized response using a template. A profile may be used, as discussed in greater detail below, which indicates a specific template to use for a particular person (for example sending a particular response to a higher level person/manager). An exemplary template is shown in FIG. 2, discussed in greater detail below.
2. In the case that the user receives a meeting that someone wants to delegate the user as the chair, the system and method of the invention is configured to:
   a. redelegate the chair to another attendee,
   b. tentatively accept/decline the delegation, or
   c. automatically reschedule the meeting using the same invited attendees and meeting details, in the manner described above.

In any of the above exemplary embodiments, the user may create a profile which could reside on both the server and the client machine, with the main copy being housed on the server for easy access from any client. In the profile, there may be a set threshold, e.g., percentage of individuals available, to select a reschedule date. The profile may contain but is not limited to:

(i) a user set of predetermined choices (to automate the process of dealing with events that coincide with days for which the user plans to be out of the office, for example);
(ii) templates for responding to scheduled conflicting events, configured for particular situations and/or persons (as should be understood by those of skill in the art);
(iii) an indication of the number of days that the user has to confirm the scheduled event prior to such scheduled event; and
(iv) an acceptable percentage of invited attendees required to execute an option such as, for example, 95% of the invited attendees.

FIG. 2 shows an exemplary template implemented in accordance with the invention. The exemplary template is used to respond to attendees of a meeting, in view of many different circumstances. For example, the template, generally shown as reference numeral 200, may be used when the recipient of an invitation is the chair of the meeting. Similarly, the template can easily be modified for various other scenarios, as described herein.

In one example, the template 200 includes a "to" field 202, a "CC" field 203 and a "subject" line field 204. In addition, the template 200 includes a "delegate chair" field 206, "accept" field 208, "decline" field 210 and "tentatively scheduled" field 212. Additionally, in embodiments, the template may include a "time/date" field 214 and "reschedule" field 216. Moreover, a "subject" field 218 may also be provided in the template 200. The template 200 may be an email, itself, or converted to an email, which one of ordinary skill in the art could easily implement.

In use, information may be extracted from an invitation email in order to populate or append to the template 200. For example, an invitation email may request "N" number of recipients to attend a meeting on a certain date and time, with recipient "1" being delegated as a chair. Recipient "1" may have a conflicting event, in which case, the system and method would extract the information from the invitation to populate the template 200. This information would include, for example, time and date of meeting, the recipients' email addresses, the subject of the meeting, etc. The recipient "1" may designate a new chair in field 218 and may decline the meeting via "decline" field 210 or alternatively reschedule the meeting using the "reschedule" field 216. Once all of the appropriate fields are populated, recipient "1" would then send the email to the remaining recipients.

Figure 3:
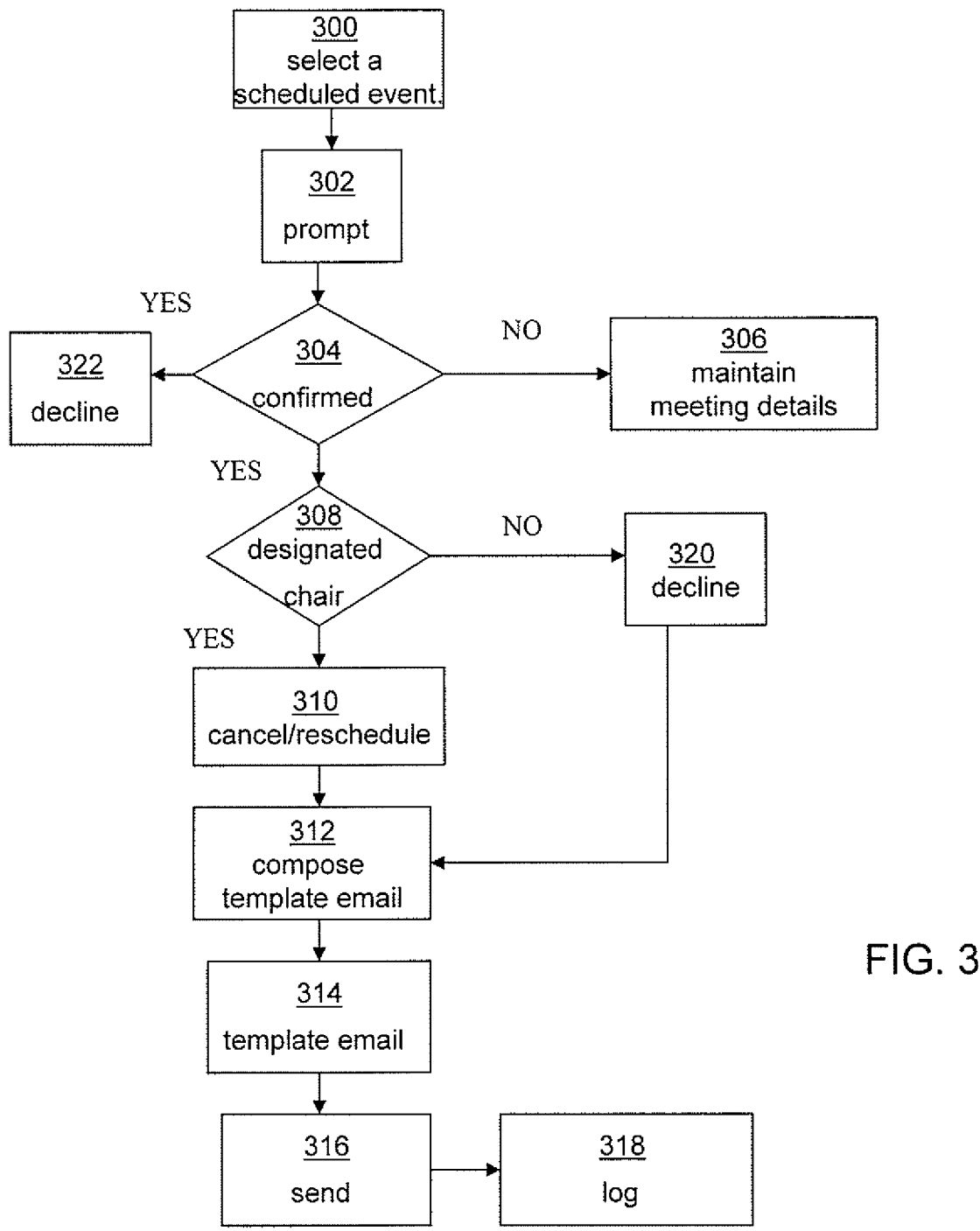
FIG. 3 is a flow chart of steps for implementing aspects of the invention.

FIG. 3 is a flow diagram implementing steps of the invention which may be implemented in the environment of FIG. 1. FIG. 3 may equally represent a high-level block diagram of the invention. The steps of FIG. 3 may be implemented and executed from either a server, in a client server relationship, or they may run on a user workstation with operative information conveyed to the user workstation to automatically resolve calendar events. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1, as should be understood and capable of implementation by those of skill in the art. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-RAN) and DVD.

Referring back to FIG. 3, at step 300, the user selects a scheduled event. This scheduled event (also referred to above as the conflicting event) may be, for example, an out of office event such as a vacation. At step 302, the process prompts the user to confirm the scheduled event. This prompt may be provided at a predetermined time period prior to the scheduled event such as one week. The prompt may be a default period or may be provided by the user via any known mechanism such as a drop down menu or manual entry.

At step 304, the scheduled event may be confirmed. This may be accomplished by user input such as, for example, a pop up window that requires a user input, e.g., "confirm" or "not confirm" buttons. If the event is not confirmed, the process proceeds to step 306. At step 306, the process will maintain (e.g., not modify) the meeting details on the scheduled event day(s). As an option, the process will remove the scheduled event days from the calendar.

If the scheduled event is confirmed at step 304, the process proceeds to step 308. At step 308, a determination is made as to whether the user is designated as the chair of the meeting. If the user is designated as the chair of the meeting, at step 310, for each meeting being held on the scheduled event, the process will automatically cancel or reschedule the meeting to a non-conflicting time. At step 312, the process will compose a template email. The composition of the template email may be accomplished by extracting the invited attendees from meeting details and using this extracted information to populate (or append) the "to" section of the email. The process may additionally extract other information from the invitation such as, for example, the subject and use this extracted information to populate (or append) the "subject" line of the template. Similarly, the process may extract additional information such as, for example, meeting date, time, and subject and populate (or append) such information in the body of the template.

At step 314, the process will convert the template to an email. In an optional step, the template may already be an email, in which case the extracted information will be appended or populated directly to such email. At step 316, the email is sent to the invited attendees. At step 318, any or all of the extracted information may be written to a log file. The user can then refer back to the log file in the case that the scheduled event has been canceled. In such a case, the information in the log can be used to populate (or append) the appropriate fields of the email, requesting that the event be reinstated for the original date and time or rescheduled for another date and time. Also, the information from the log can be used to repopulate the calendar, thus setting up the meeting automatically.

If the user is not designated as the chair of the meeting at step 308, the process will proceed to step 320. At step 320, the process will automatically decline the meeting and thereafter process according to the steps 312, 314 and 316. In the composed email, a decline notification will be provided to the invited attendees.

As an alternative approach, if the scheduled event is confirmed at step 304, the process proceeds to step 322. At step 322, the process will provide an automatic decline message for each meeting invitation received. As discussed above, the decline message (e.g., email) may automatically be populated (or appended) with the event, event dates, etc. in the appropriate fields. The meeting details may also be written to a log for future use, as discussed above.

An example algorithm implementing the steps of FIG. 3 is provided below. It should be understood that the algorithm below is an exemplary algorithm and should not be considered a limiting feature of the invention. In other words, the invention contemplates other algorithms which can be implemented to process the steps of FIG. 3.

```
user selects/chooses scheduled events.
x days prior to the event, user is asked to confirm scheduled event
if scheduled event not confirmed
    then
    {
        do not modify meeting details on scheduled event days
        and remove schedule event days from vacation calendar.
            for any meeting invites that arrive, accept as tentative
    }
if scheduled event confirmed
{
    for each meeting details on the schedule event day (s)
        if you are the chair of the meeting
        then
            {auto cancel or reschedule the meeting
            compose template email
                extract invites from meeting details and use for
    the to section of the email
                extract subject and append to subject of
```

```
             template.
                   extract meeting date, time, and subject and
             append the body of the template
                   send email
                   write meeting details to logfile}
             if you are not the chair of the meeting
                then
                   {auto decline the meeting
                   compose template email
                         extract chair from meeting details and use for
                the to section of the email
                         extract subject and append to subject of
             template.
                         extract meeting date, time, and subject and
             append the body of the template
                         send email
                         write meeting details to logfile}
             for each meeting invite received
                 auto decline the meeting and include event and event
             dates in the body of the decline notice
                         write details to logfile
             }
```

While the invention has been described in terms of embodiments, those skilled in the art will recognize that the invention can be practiced with modifications and in the spirit and scope of the appended claims.

What is claimed is:

1. A method comprising:
   determining, via at least one computer, whether a scheduled event is confirmed;
   determining, via the at least one computer, whether a user is designated as a chair of a meeting, wherein one of:
      when the user is designated as the chair and the scheduled event is confirmed, for each meeting conflicting with the scheduled event, cancel or reschedule the meeting to a non-conflicting time; and
      when the user is not designated as the chair and the scheduled event is confirmed, perform an action.

2. The method of claim 1, further comprising composing a response to an invitation for the meeting when there is a conflict between the meeting and the scheduled event.

3. The method of claim 2, wherein the response includes extracting meeting details from the invitation and automatically populating or appending the meeting details to appropriate fields in the response.

4. The method of claim 3, wherein the extracted meeting details include at least one of subject, meeting date, time, and contact information for invited attendees.

5. The method of claim 2, further comprising sending the response via email to at least one invited attendee of the meeting, wherein the response includes one of: tentatively accepting the meeting, canceling the meeting, and rescheduling the meeting.

6. The method of claim 3, wherein the extracted meeting details are placed in a log file.

7. The method of claim 6, further comprising using the log file to compose an email, when the conflicting event is canceled, to reschedule the meeting or request the meeting be held at an original time.

8. The method of claim 3, wherein the extracted meeting details are used to populate a calendar when the scheduled event is canceled.

9. The method of claim 1, wherein when the scheduled event is confirmed, the method provides an automatic decline message for each meeting invitation received which conflicts with the scheduled event.

10. The method of claim 1, wherein the perform an action is declining the meeting.

11. The method of claim 1, wherein the determining whether the scheduled event is confirmed is provided via a user prompt.

12. The method of claim 1, further comprising populating meeting details on a calendar and removing the scheduled event from the calendar when the scheduled event is not confirmed.

13. The method of claim 1, wherein the scheduled event is an out of office event.

14. The method of claim 1, further comprising providing a user prompt a certain period prior to the scheduled event, wherein the certain period is one of a default period or provided by user input.

15. The method of claim 1, wherein the steps of claim 1 provide event resolution for both pre-scheduled and post-scheduled events that coincide with times in which there is the scheduled event.

16. The method of claim 1, wherein the steps of claim 1 are provided by a service provider under a subscription and/or fee agreement and/or based on advertising content to one or more third parties.

17. The method of claim 1, wherein a service provider at least one of creates, maintains and supports a computer infrastructure that performs the steps of claim 1.

18. The method of claim 1, further comprising maintaining pre-scheduled or post-scheduled event information in a log and retrieving the pre-scheduled or post-scheduled event information in an event that the scheduled event is canceled.

19. The method of claim 1, further comprising providing a template for responding to an invitation for the meeting, the template being automatically updated with information from the invitation.

20. The method of claim 1, wherein when the scheduled event is definite, changing a response from "accept" to "decline".

21. The method of claim 1, wherein when the meeting is chaired by the user, and the scheduled event is tentative or definite, delegating the chair to another invited attendee of the meeting by parsing names of invited attendees and selecting one of the parsed names.

22. The method of claim 21, further comprising sending a cancel response to the invited attendees when the delegated chair declines.

23. The method of claim 1, wherein, when a post-scheduled event and the scheduled event are tentatively scheduled and the meeting is to be chaired by the user, the method further comprises at least one of:
   redelegating the chair to another invited attendee by parsing an invitation; and
   automatically rescheduling the meeting using meeting details to populate a response email.

24. The method of claim 1, further comprising creating a profile which resides on at least one of a server and client machine, wherein the profile contains at least one of:
   a user set of predetermined choices to automate processes associated with conflicts with the scheduled event;
   templates for responding to the meetings when a conflict arises, the templates being populated automatically with meeting details;
   a time period that the user has to confirm the scheduled event prior to the scheduled event; and
   an acceptable percentage of invited attendees required to execute an option.

* * * * *